United States Patent [19]

Hayashi

[11] Patent Number: 4,913,019
[45] Date of Patent: Apr. 3, 1990

[54] HAM LOAF SIZE SENSING MEANS IN A HAM SLICING MACHINE

[75] Inventor: Hiroshi Hayashi, Wakayama, Japan

[73] Assignee: Ryowa Ltd., Japan

[21] Appl. No.: 382,774

[22] Filed: Jul. 19, 1989

[30] Foreign Application Priority Data

Jul. 29, 1988 [JP] Japan .................................. 63-191389

[51] Int. Cl.$^4$ .......................... B26D 5/00; B26D 5/20; B26D 7/06
[52] U.S. Cl. ........................................ 83/367; 83/355; 83/360; 83/363; 83/422; 83/437
[58] Field of Search .................. 83/367, 360, 355, 363, 83/361, 449, 422, 437

[56] References Cited

U.S. PATENT DOCUMENTS

| | | | |
|---|---|---|---|
| 2,966,186 | 12/1960 | Garapolo | 83/367 |
| 3,105,533 | 10/1963 | Hensgen et al. | 146/241 |
| 3,144,893 | 8/1964 | Dahms | 146/95 |
| 3,762,257 | 10/1973 | Mathews, Jr. | 83/367 X |
| 4,208,933 | 6/1980 | Skidmore | 83/367 |
| 4,339,972 | 7/1982 | Wepner et al. | 83/367 X |
| 4,428,263 | 1/1984 | Lindee et al. | 83/354 |
| 4,572,044 | 2/1986 | Antonissen | 83/367 X |

Primary Examiner—Douglas D. Watts
Assistant Examiner—Kenneth E. Peterson

[57] ABSTRACT

In a ham loaf slicing machine having a rotary cutter supported for cyclical orbital movement into and out of a slicing station, a ham loaf size sensing mechanism is provided in a collar having an aperture for supporting a ham loaf in position at the entrance to the slicing station to control the speed of ham loaf feed toward the slicing station. In the inner wall of the collar which defines the aperture, an annular groove and a draw-out passage for a flexible strap-like member which leads to a location outside the collar are provided. The strap-like member is disposed in the annular groove, one end of the member being fixed at a suitable location in the groove. The other end of the strap-like member is positioned outside the collar past the draw-out passage and is connected to a sensor. Variations in thickness of the ham loaf passing through the aperture of the collar are continuously sensed by the sensor according to the movement of the other end of the strap-like member in engagement with the periphery of the ham loaf.

3 Claims, 4 Drawing Sheets

HAM LOAF SIZE SENSING MEANS IN A HAM SLICING MACHINE

BACKGROUND OF THE INVENTION

1. Field of the Invention

This invention relates to ham loaf size sensing means in a hamloaf slicing machine.

2. Prior Art

Ham loaves are usually machine sliced and then packaged into units of packages suitable for retail sale, each package usually having a content ranging from several slices to more than ten slices. The selling price per package is determined by the weight of the sliced ham content and the price per unit weight. Therefore, it is necessary that the weight of the sliced ham content per package must meet a predetermined weight requirement. More specifically, actual weight A' of the sliced ham content of the package must be equal to the prescribed weight A indicated on each package ( A'=A ) or in plus relation to the prescribed weight A ( A'>A); in no way is the former weight allowed to be in minus relation to the latter weight ( A'<A).

Now, in one known ham loaf slicing maching, a ham loaf supported in an upright or slightly inclined condition is fed downwardly at a predetermined speed by a pair of conveyors arranged in opposed relation along the longitudinal direction of the ham loaf while it is held between the conveyors, and as the end of the ham loaf advances into a slicing station, it is cut off to a predetermined thickness by a cutter rotating at constant speed.

Therefore, if ham loaves are uniform in thickness, ham slices cut by such slicing machine must be constantly uniform in weight. Actually, however, not every ham loaf manufactured has satisfactory roundness in its cross-sectional configuration. It is also true that no ham loaf has uniform thickness ( cross-sectional area ) throughout its entire length. In the manufacture of ham loaves, at present, it is extremely difficult to uniformize various parts of each ham loaf in their cross-sectional dimensions, much more is it difficult to produce ham loaves which are completely uniform in size.

Therefore, it has been impossible to constantly obtain ham slices of uniform weight by employing such slicing machine even if slicing accuracy were improved in terms of sliced ham thickness. As such, a matter of great concern to sliced ham producers has been how actual per-package weight A' of machine sliced ham could be brought closer to the prescribed per-package weight A on the plus ( A'>A ) side.

This problem can be solved by solved by providing at a position prior to the slicing station a suitable sensing device which can constantly sense variations in cross-sectional area of a ham loaf at a location adjacent the slicing station, whereby the rate of ham loaf feed toward the slicing station is controlled according to the variation in ham loaf cross-sectional area detected. That is, the advancing speed of the ham loaf is increased with respect to its portions having a relatively small cross-sectional area, whereas the advancing speed of the ham loaf is lowered with respect to its portions having a relatively large cross-sectional area. In this way, ham slices can be cut thinner where they are diametrically larger, and can be cut thicker where they are diametrically smaller, it being thus possible that actual per-package weight A' of ham slices is brought closer to the prescribed per-package weight A on the plus ( A'>A ) side, with less variation in weight.

Several food loaf slicing machines having such food loaf size sensing device and a food loaf feed rate control device, whereby possible variations in sliced food weight are prevented, are disclosed in U.S. Pat. Nos. 3,105,533; 3,144,893; and 4,428,263.

Of these, the food loaf slicing machine disclosed in U.S. Pat. No. 4,428,263 includes such arrangement for detecting the size of a food loaf product, such as ham loaf, as shown in FIGS. 6 and 7, which comprises a collar 55 encompassing the ham loaf 51 at the entrance to the slicing station 52 as the lower end of the loaf fed downwardly by a pair of feed conveyors 53, 54 enters the collar, the collar being of transverse split construction, including first and second collar members $55_1$, $55_2$. More specifically, the ham loaf size sensing arrangement comprizes the first collar member $55_1$ being movable toward and away from the second collar member $55_2$ in a direction transverse to the path of ham loaf movement, a biasing means connected to the first collar member $55_1$ ( movable collar member ) for biasing it toward the second collar member $55_2$ ( fixed collar member ) to maintain both collar members in predetermined limited pressure engagement with the lower end of the feed loaf, and a loaf size sensor 57 connected to the first collar member $55_1$ for sensing movements of the first collar member $55_1$ indicative of variations in cross-sectional area of the ham loaf 51 passing through the space between the collar members $55_1$ and $55_2$.

Problems to be Solved by the Invention

However, this ham loaf size sensing arrangement involves the following problems:

i. Variations in thickness of the ham loaf 51 proportional to the square of change in diameter of the loaf are measured on the basis of displacement of the first collar member $55_1$ in diametrical directions of the loaf; as such, measurements obtainable are rather low in accuracy.

ii. Since the first collar member $55_1$ constitutes (serves as) both a holding member for holding the ham loaf 51 at the entrance to the slicing station 52 and a measuring member movable correspondingly to variations in ham loaf size, all impact of a rotary cutter 58 acting on the the ham loaf 51 at the slicing station 52 is applied on the size measuring portion constituted by the first collar member $55_1$. Such impact adversely affects the measuring portion from the standpoint of measurement accuracy.

iii. In order that the first collar member $55_1$ constituting the loaf size measuring portion may accurately hold the ham loaf in the vicinity of the lower end thereof, that is, if it is to perform its function as a holder, it is required that the first collar member $55_1$ be sufficiently positively biased by the biasing means 56 toward the second collar member $55_2$.

As such, wide variations in measurements are inevitable between the case where changes in thickness of a hard ham loaf are measured on the basis of displacement of the first collar member $55_1$ which is constantly under such strong biasing force and the case where changes in thickness of a soft ham loaf are measured on the basis of such displacement.

iv. Especially where the cross-sectional configuration of the ham loaf is ellipsoidal, it is necessary to measure the diameter of the ham loaf only after the first collar member $55_1$ is firmly pressed against the ham loaf 51 until a round sectional configuration is reached with respect to the ham loaf, and therefore, if the ham loaf is hard, resistance to passage of the ham loaf through the holder members $55_1$, $55_2$ is excessively involved, with the result that difficulty arises in feeding the ham loaf toward the slicing station.

SUMMARY OF THE INVENTION

Object of the Invention

This invention is directed to overcoming the foregoing problems, and accordingly the invention proposes an improved ham loaf size sensing device in which instead of the collar of transverse split construction employed in the ham loaf size sensing arrangement described in U.S. Pat. No. 4,428,263, a collar comprised of a single member is employed as in an earlier known food loaf slicing machine, but in which a ham loaf size sensing element is employed which is comprised of a member separate from the member constituting the collar which is disposed in the collar.

Means for Solving the Problems

In order to accomplish aforesaid object, the present invention provides: in a ham loaf slicing machine including a pair of loaf feed conveyors for continuously advancing a ham loaf into a slicing station while holding the loaf therebetween, a collar having an aperture for receiving a lower end portion of the ham loaf advanced by the loaf feed conveyors to hold the loaf therein at the entrance to the slicing station, and a rotary cutter supported for cyclical orbital movement into and out of the slicing station at a level right under the collar and in a direction transverse to a food loaf path, ham loaf size sensing means for controlling the speed of the loaf feed conveyors according to variations in thickness of the loaf comprising:

(1) an annular groove cut in an inner wall portion of said collar defining said aperture for supporting a flexible strap-like member therein along the circumference of the aperture, said collar being formed with a draw-out passage for said strap-like member which extends tangentially from said annular groove and outwardly of said collar;

(2) said flexible strap-like member being disposed in said annular groove to define a ring-shaped measuring portion, one end of said strap-like member being fixed at a suitable place in said annular groove, the other end thereof being positioned outside said collar past the draw-out passage;

(3) a displacement regulating means for said ring-shaped measuring portion, provided on said strap-like member to restrict projection of said ring-shaped measuring portion from said annular groove within given limits in which said measuring portion is restrained from slipping out of said annular groove, said ring-shaped measuring portion being displaceable in said annular groove and between a retracted position in which it is settled in the annular groove and an outermost projected position to which it is allowed to project from the annular groove by said displacement regulating means;

(4) a biasing means connected to said strap-like member for biasing the ring-shaped measuring portion in the annular groove outwardly from said groove to thereby cause said measuring portion to encompass the ham loaf under a predetermined pressure as the ham loaf passes through the aperture of the collar; and (5) a sensor mounted to said strap-like member for sensing linear movements of the strap-like member at said other end in longitudinal directions thereof which are indicative of variations in thickness of the ham loaf passing through aperture of the collar.

Function

The ham loaf size sensing means of the invention, constructed as stated above, function as follows.

A flexible strap-like member disposed in an annular groove cut in an inner wall portion of a collar and running along the annular groove has at least its one end fixed at a suitable place in the annular groove, the other end thereof being drawn out of the collar through a draw-out passage for the strap-like member which extends tangentially from the annular groove and outwardly of the collar. The strap-like member disposed in the annular groove defines a ring-shaped measuring portion which is biased by a biasing means outwardly from the groove to encompass a ham loaf as the loaf passes through the collar, and whose outward movement or projection from the annular groove is restricted by a displacement regulating means for the measuring portion within given limits in which the measuring portion is restrained from slipping out of the annular groove. The ring-shaped measuring portion is therefore displaceable in the annular groove between a retracted position in which it is settled in the annular groove and an outermost projected position to which it is allowed to project from the annular groove by the displacement regulating means. Accordingly, when no ham loaf is passing through the collar, the ring-shaped measuring portion is held in the outermost projected position within the limits in which it is allowed to project from the annular groove but restrained from slipping out of the groove by the displacement regulating means, or in other words, the ring-shaped measuring portion projects radially inwardly from the inner periphery of the collar to a maximum allowable limit at which it is still restrained from slipping off the annular groove. As a ham loaf is advanced into the collar when the ring-shaped measuring portion is in such position, the lower end of the ham loaf strikes against the measuring portion projecting radially inwardly from the inner periphery of the collar.

Since the ring-shaped measuring portion of the strap-like member is retractable into the annular groove against aforesaid biasing force, the ham loaf advanced into the collar is received into the collar, while broadening the diameter of the measuring portion, upon contact with the measuring portion, the ham loaf being thus allowed to pass through the collar. While the ham loaf is passing through the collar, the ring-shaped measuring portion is caused to encompass the ham loaf by the biasing means connected to the strap-like member and under the predetermined pressure.

Therefore, as the ham loaf passes through the collar, the strap-like member is moved, at said other end (free end) thereof positioned outside the collar, linearly along the length of that portion of the strap-like member which encompasses a ham loaf portion passing through the collar, according to the thickness of said portion of the ham loaf.

The ham loaf size sensing means according to the invention includes a sensor disposed at said other end of the strap-like member for sensing the movement of the strap-like member. In the sensing means of the invention, therefore, variations in thickness of the ham loaf passing through the collar are measured on the basis of changes in longitudinal movement of the strap-like member encompassing the ham loaf; in other words, variations in ham loaf thickness are measured on the basis of variations in circumference of the ham loaf and not on the basis of variations in its diameter.

DESCRIPTION OF THE PREFERRED EMBODIMENT

Embodiment 1

Figure 1:
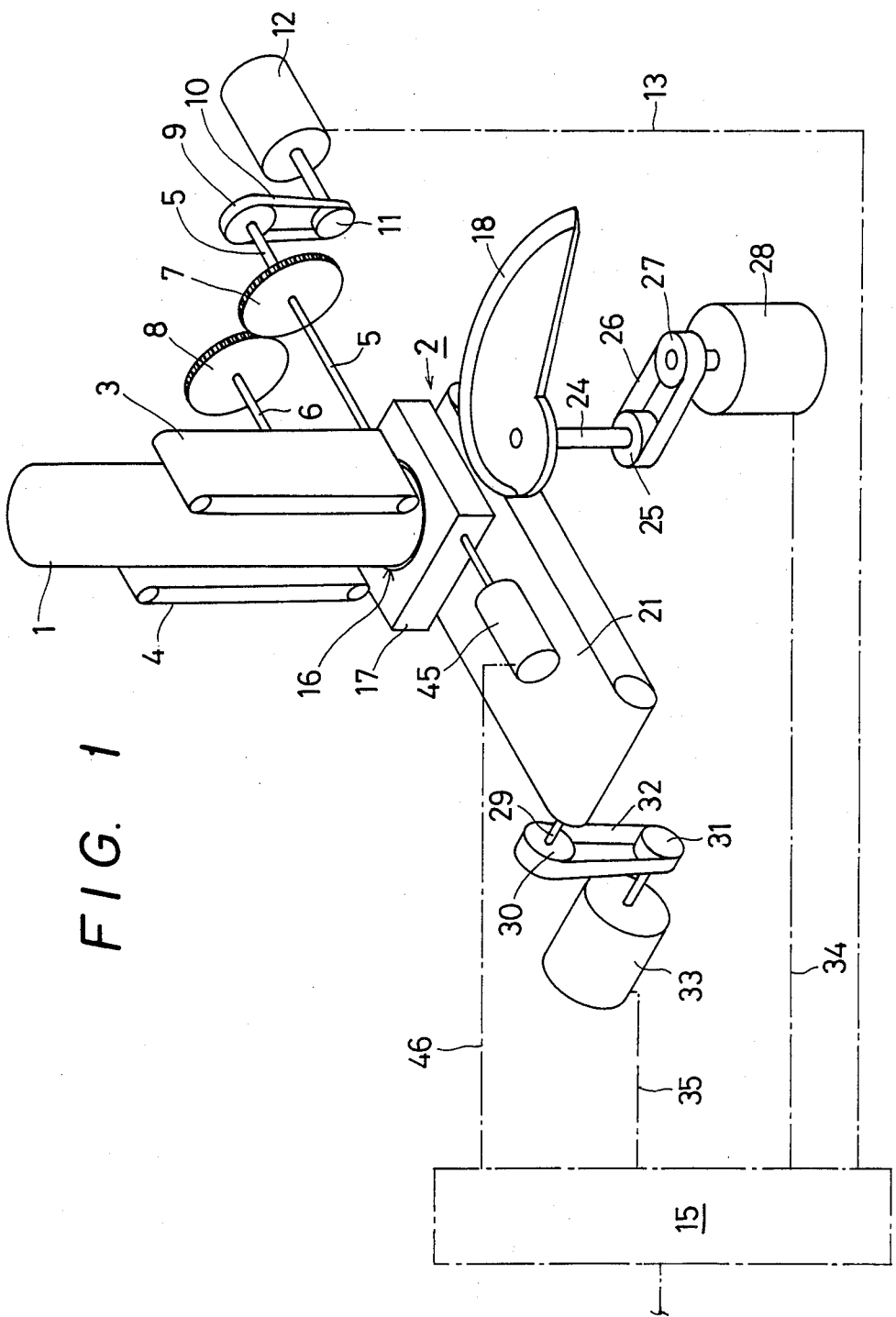
FIG. 1 is a schematic perspective view showing a ham loaf slicing machine employing the ham loaf size sensing means of the invention.
Figure 2:
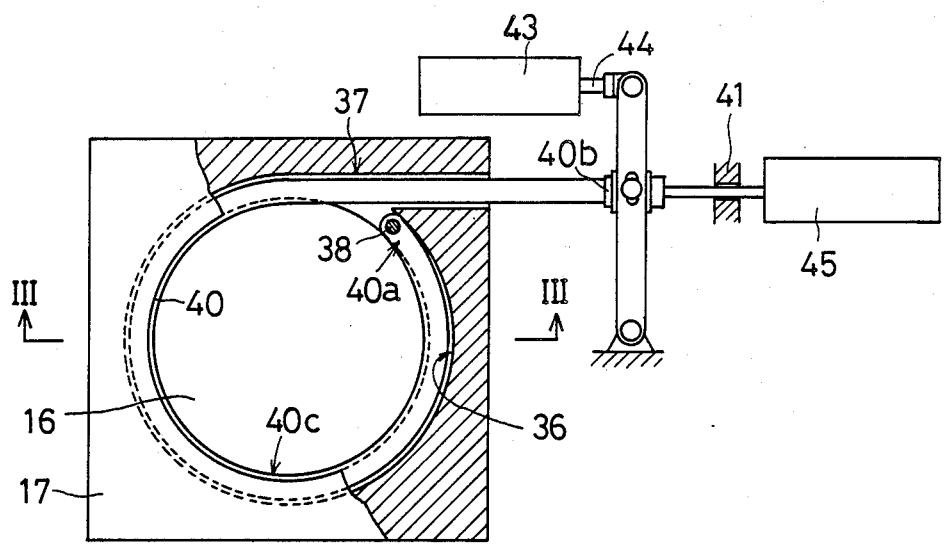
FIG. 2 is a plan view showing one embodiment of the ham loaf size sensing means in a cross section of a collar.

A ham loaf slicing machine in which the ham loaf size sensing means according to this invention is employed is of the following arrangement.

(Fundamental Construction of the Ham Slicing Machine)

The ham slicing machine includes a pair of loaf feed conveyors 3, 4 vertically arranged in opposed relation for continuously advancing ham loaves toward a slicing station 2 while holding each ham loaf 1 in upright position therebetween. Drive shafts 5, 6 of the pair of loaf feed conveyors 3, 4 are connected together by gears 7, 8 held in mesh engagement with each other. The one shaft 5 is connected to a variable speed motor 12 through a pulley 11 so that the pair of loaf feed conveyors 3, 4 are driven downwardly with respect to their opposed surfaces when the the motor 12 is driven. Accordingly, when the loaf feed conveyors 3, 4 are driven, the ham loaf 1 supported between the conveyors 3, 4 is downwardly advanced into the slicing station 2.

The variable speed motor 12 is connected to a control box 15 through an electric line 13. The feed rate of ham loaves 1 by the conveyors 3, 4 toward the slicing station 2 is determined by the run speed of the variable speed motor 12 and variable accordingly.

At a level below the pair of loaf feed conveyors 3, 4 there is disposed a collar 17 having an aperture 16 for receiving the lower end of the ham loaf 1 is advanced downwardly by the conveyors 3, 4 and supporting it at the entrance to the slicing station 2. Below the collar 17 there are disposed a rotary cutter 18 which performs cyclic orbital movement into and out of the slicing station 2 at a position right under the collar 17 and in a direction transverse to a path for the ham loaf 1 leaving the aperture 16 of the collar 17, and a belt conveyor 21 for receiving thereon slices 20 cut at the slicing station 2 and transporting same externally from the slicing machine.

Therefore, in this ham loaf slicing machine, the ham loaf 1 fed downwardly by the pair of conveyors 3, 4 passes through the aperture 16 of the collar 17 at a speed controlled by the control box 15 and is then advanced into the slicing station 2 below the collar 17; at the slicing station 2 the loaf is cut into slices 20 by the rotary cutter 18 and, as they are cut, the slices 20 are allowed to drop by gravity onto the belt conveyor 21 below the slicing station 2.

Thus, the thickness of each individual slice allowed to drop on the belt conveyor 21 for transport outward from the ham loaf slicing machine is controlled by the run speed of the variable speed motor 12 controlled by the control box 12.

A shaft 24 of the rotary cutter 18 is connected to a motor 28 through a pulley 25, a belt 26, and a pulley 27. A drive shaft 29 of the belt conveyor 21 is connected to a motor 33 through a pair of pulleys 30, 31, and a belt 32. The motors 28, 33 are connected to the control box 15 through power supplies 34 and 35 respectively.

Figure 3:
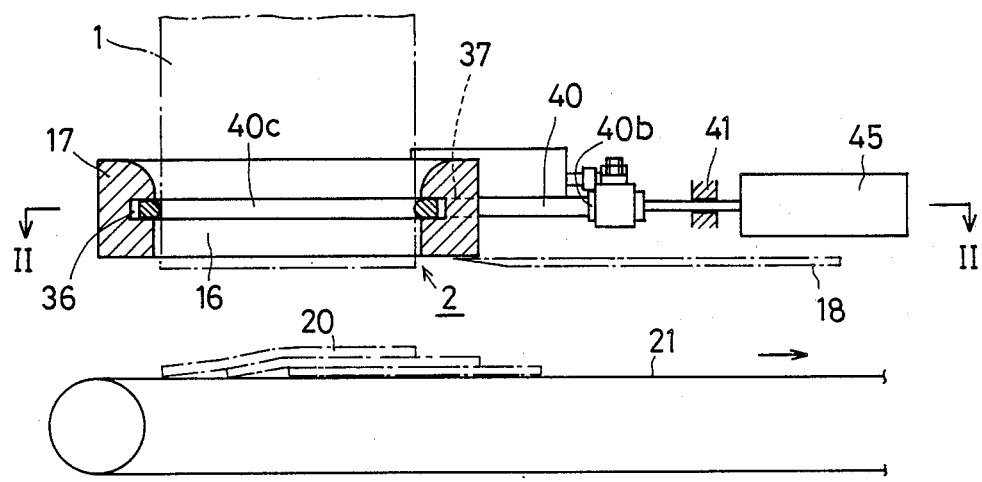
FIG. 3 is a longitudinal sectional view thereof.

While the rotary cutter 18 is rotated at constant speed by the motor 18, the run speed of the motor 33 which drives the belt conveyor 21 is regulated by the control box 15 so that the belt conveyor 21 is driven in predetermined cycles of high speed operation and low speed operation. When the belt conveyor 21 is in low speed operation, ham slices 20, as they are cut by the rotary cutter 18, drop onto the conveyor 21 in such manner that a predetermined number of slices 20 are placed on the conveyor 21 in overlapping relation (see FIG. 3), while when the belt conveyor 21 is in high speed operation, individual blocks of slices 20 placed on the conveyor 21, each block consisting of the predetermined number of slices, are arranged in spaced apart relation.

(Ham Loaf Size Sensing Mechanism)

For purposes of measuring, at the site of aperture 16 of the collar 17, the thickness of the ham loaf as the loaf passes through the aperture 16, and controlling the run speed of the variable speed motor 12 according to variations in thickness measurements, the collar 16 is equipped with a ham loaf size sensing mechanism which will be described hereinbelow.

The collar 17 has an annular groove 36 having a cross-sectional configuration of U shape cut in a central portion of the inner wall of the collar 17 by which the aperture 16 for passage of ham loaf 1 is defined. A hole 37 bored through the collar 17 defines a drawout passage for a strap-like member 40 which extends tangentially from the annular groove 36 and outwardly of the collar 17. The strap-like member 40 is comprised of a moderately flexible material, such as a rubber belt, having an arched cross-sectional configuration, and is disposed in a ring-shape pattern in and along the annular groove 36, with its arched surface set toward the center of the aperture 16, one end 40a of the strap-like member 40 being fixed by a pin 38 at a suitable place in the annular groove 36, the other end 40b thereof being postioned outside the collar 17 past the draw-out passage 37.

Said other end 40b of the strap-like member 40 is connected to a stopper 41. The ring-shaped portion, designated by 40c, of the strap-like member 40 which is disposed in and along the annular groove 36 is displaceable only between a retracted position at which the ring-shaped portion 40c is settled in the annular groove 36 and an outermost projected position to which the ring-shaped portion 40c is allowed to project from the annular groove 36 by the stopper 41 which acts on said other end 40b of the strap-like member 40. The amount of projection of the ring-shaped portion 40c from the annular groove 36 is restricted within given limits in which the ring-shaped portion 40c is restrained from slipping out of the annular groove 36.

The end 40b of the strap-like member 40 which is positioned outside the collar 17 is connected to a piston rod 44 of an air cylinder 43 which operates to pull said end 40b to bias the ring-shaped portion 40c of the strap-like member 40 outwardly from the annular groove 36. When the ring-shaped portion 40c of the strap-like member 40 is biased outwardly from the annular groove 36 by the air cylinder 43, the ring-shaped portion 40c encompasses or wraps round a ham loaf 1 passing through the aperture 16 of the collar 17, under pressure from the air cylinder 43, and in this conjunction said other end 40b moves accoring to variations in thickness of the ham loaf 1.

A sensor 45 for sensing the movement of the other other end 40b is connected to said other end 40b, and the ring-shaped portion 40c of the flexible strap-like member 40 constitutes a ring-shaped measuring portion for measuring the thickness of the ham loaf 1 passing through the aperture 16 of the collar 17.

In the ham loaf size sensing mechanism of this embodiment, variations in thickness of the ham loaf 1 passing through the aperture 16 of the collar 17 is measured by the ring-shaped measuring portion 40c which wraps round the periphery of the ham loaf 1 for engagement therewith, and the measurements are taken in terms of variations in circumferential length of the ham loaf 1 by the sensor 45.

Each value measured by the sensor 45 is transmitted to the control box 15 through a signal line 46 (see FIG. 1), and the ham loaf feed conveyors 3, 4 are controlled according to the measured value.

Other Embodiment

Figure 4:
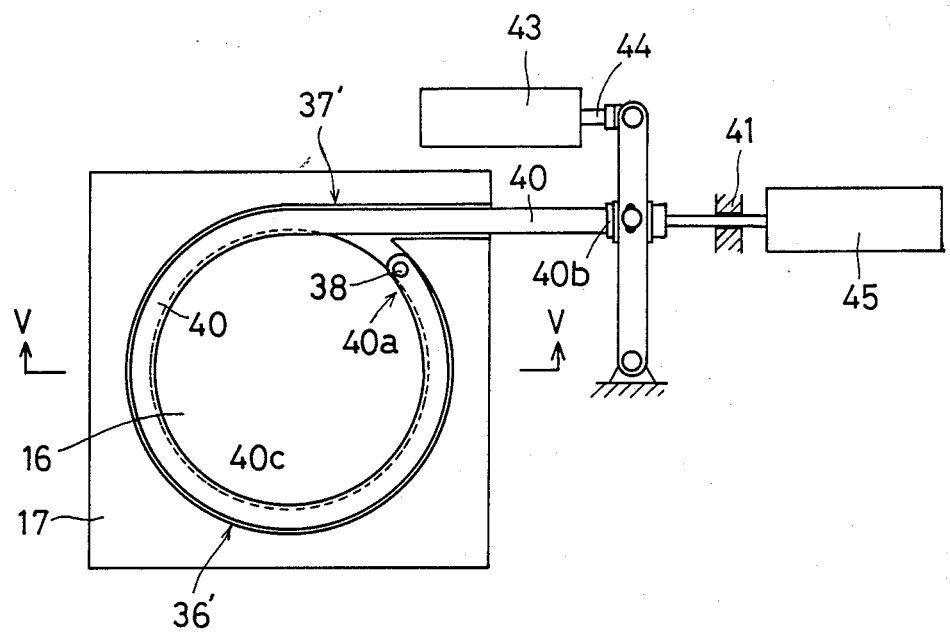
FIG. 4 is a plan view of a collar showing another embodiment of the ham loaf size sensing means of the invention.
Figure 5:
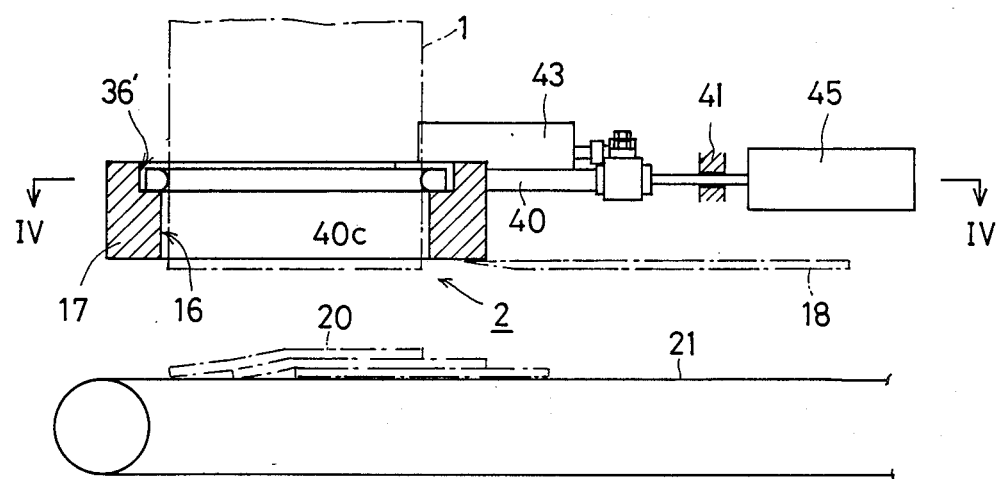
FIG. 5 is a longitudinal sectional view thereof.
Figure 6:
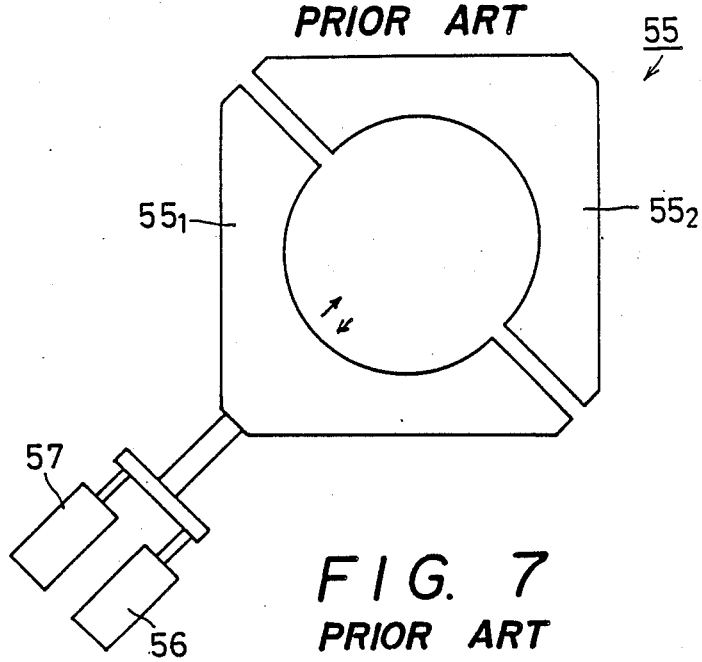
FIG. 6 is a schematic plan view of a holder showing a prior-art arrangement.
Figure 7:
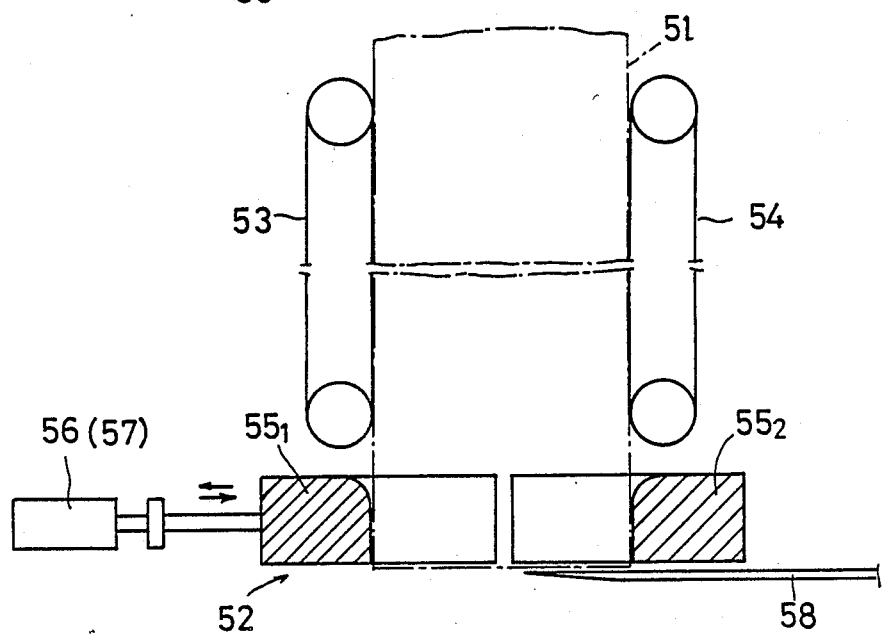
FIG. 7 is a longitudinal sectional view thereof.

In the above described embodiment, the annular groove 36 is formed in a central portion of the inner wall of the collar 17, but in another embodiment, as FIGS. 4 and 5 illustrate, an annular groove 36' having a cross-sectional configuration of L shape is cut in an upper edge portion of the inner wall of the collar 17. In this case, a groove 37' having a cross-sectional configuration of U shape is cut in the upper surface of the collar 17 to define a drawout passage 37' for the strap-like member which extends tangentially from the annular groove 36'.

ADVANTAGES OF THE INVENTION

In the ham loaf size sensing means of the invention, as already described, a ring-shaped measuring portion of a flexible strap-like member fixed at one end at a suitable location in an annular groove cut in an inner wall portion of a collar positioned right above a slicing station is supported in the annular groove. The ring-shaped measuring portion wraps round the periphery of a ham loaf passing through an aperture of the collar. At the other end of the strap-like member positioned outside the collar, a portion thereof, as it is drawn out, moves linearly along its length according to variations in thickness of the ham loaf, and such movement of that portion is sensed by a sensor. Thus, variations in thickness of the ham loaf passing through the aperture of the collar are measured in terms of variations in circumferential length of the ham loaf and not variations in diameter of thereof. Therefore, the ham loaf size sensing means of the invention can provide some three times as high measurement accuracy as above cited prior art arrangement in which variations in ham loaf size are measured in terms of variations in cross-sectional area of the ham loaf.

The ham loaf size sensing means of the invention enables measurement of ham loaf size at the site of the collar that is nearest to the slicing station; and the measuring portion which measures the thickness of the ham loaf as it goes in contact therewith is a ring-shaped measuring portion of a flexible strap-like member which is separate from the collar. Therefore, it is less subject to the influence of impact force of the rotary cutter acting on the ham loaf which may otherwise adversely affect the accuracy of measurement.

Furthermore, since the measuring portion for measurement of ham loaf size in the ham loaf size sensing means is constructed of a flexible strap-like member which is separate from the collar and since it is not a part of the clollar for holding the ham loaf in position, the ring-shaped measuring portion of the flexible strap-like member need not be firmly pressed against the ham loaf. In the loaf size sensing means of the invention, therefore, the ringshaped measuring portion may be softly pressed against the ham loaf and thus measurements are less liable to the influence of variations in hardness of the ham loaf.

What is claimed is:

1. In a ham loaf slicing machine including a pair of loaf feed conveyors for continuously advancing a ham loaf into a slicing station while holding the loaf therebetween, a collar having an aperture for receiving a lower end portion of the ham loaf advanced by the loaf feed conveyors to hold the loaf therein at the entrance to the slicing station, and a rotary cutter supported for cyclical orbital movement into and out of the slicing station at a level right under the collar and in a direction transverse to a food loaf path, ham loaf size sensing means for controlling the speed of the loaf feed conveyors according to variations in the thickness of the loaf comprising:

(1) an annular groove cut in an inner wall portion of said collar defining said aperture for supporting a flexible strap-like member therein along the circumference of the aperture, said collar being formed with a draw-out passage for said strap-like member which extends tangentially from said annular groove and outwardly of said collar;

(2) said flexible strap-like member being disposed in said annular groove to define a ring-shaped measuring portion, one end of said strap-like member being fixed at a suitable place in said annular groove, the other end thereof being positioned outside said collar past the draw-out passage;

(3) a displacement regulating means for said ring-shaped measuring portion, provided on said strap-like member to restrict projection of said ring-shaped measuring portion from said annular groove within given limits in which said measuring portion is restrained from slipping out of said annular groove, said ring-shaped measuring portion being displaceable in said annular groove and between a retracted position in which it is settled in the annular groove and an outermost projected position to which it is allowed to project from the annular groove by said displacement regulating means;

(4) a biasing means connected to said strap-like member for biasing the ring-shaped measuring portion in the annular groove outwardly from said groove to thereby cause said measuring portion to encompass the ham loaf under a predetermined pressure as the ham loaf passes through the aperture of the collar; and (5) a sensor mounted to said strap-like member for sensing linear movements of the strap-like member at said other end in longitudinal directions thereof which are indicative of variations in thickness of the ham loaf passing through said aperture of the collar.

2. Ham loaf size sensing means in a ham loaf slicing machine as set forth in claim 1 wherein said annular groove is a groove having a cross-sectional configuration of U shape which is cut in a central portion of the inner wall of the collar, said draw-out passage for the strap-like member being a hole bored through the wall of the collar.

3. Ham loaf size sensing means in a ham loaf slicing machine as set forth in claim 1 wherein said annular groove is a groove having a cross-sectional configuration of L shape which is cut in an upper edge portion of the inner wall of the collar, said draw-out passage for the strap-like member being a groove cut in the upper surface of the collar.

* * * * *